(12) United States Patent
Iwata

(10) Patent No.: US 9,567,144 B2
(45) Date of Patent: Feb. 14, 2017

(54) ATTACHMENT STRUCTURE FOR A BINDING BAND

(71) Applicant: Sumitomo Wiring Systems, Ltd., Yokkaichi, Mie (JP)

(72) Inventor: Makoto Iwata, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 14/904,120

(22) PCT Filed: Jul. 18, 2014

(86) PCT No.: PCT/JP2014/069180
§ 371 (c)(1),
(2) Date: Jan. 11, 2016

(87) PCT Pub. No.: WO2015/019830
PCT Pub. Date: Feb. 12, 2015

(65) Prior Publication Data
US 2016/0159539 A1    Jun. 9, 2016

(30) Foreign Application Priority Data

Aug. 7, 2013  (JP) ................................. 2013-163992

(51) Int. Cl.
*H02G 3/20* (2006.01)
*F16L 3/08* (2006.01)
(Continued)

(52) U.S. Cl.
CPC ............ *B65D 63/1027* (2013.01); *H02G 3/30* (2013.01); *B65D 63/1063* (2013.01); *B65D 2563/101* (2013.01); *F16B 2/08* (2013.01)

(58) Field of Classification Search
CPC ............ B65D 63/1027; B65D 63/1063; B65D 2563/101; F16B 2/08; H02G 3/30; H02G 3/32
(Continued)

(56) References Cited

U.S. PATENT DOCUMENTS 3,152,219 A * 10/1964 Murray ................ H01R 9/2416
174/60
3,802,654 A * 4/1974 Jenko ..................... H02G 3/065
174/72 A
(Continued)

FOREIGN PATENT DOCUMENTS

JP  2-144566  12/1990
JP  9-51624   2/1997
(Continued)

OTHER PUBLICATIONS

International Search Report.

*Primary Examiner* — Anita M King
(74) *Attorney, Agent, or Firm* — Gerald E. Hespos; Michael J. Porco; Matthew T. Hespos

(57) ABSTRACT

An attachment structure for binding band is for binding and fixing a held body (12) to a supporting wall (24) of a holding body (10) by a binding band (14) and includes a recess (22) open on the supporting wall (24) of the holding body (10) and a side wall (26) intersecting with the supporting wall (24) and a locking projection (32) cantilevered toward a side wall opening (28) of the recess (22) from a bottom surface (30) facing the side wall portion opening (28). The binding band (14) is tightened together with the held body (12) in a state where a band main body (36) of the binding band (14) arranged in a ring-like manner around the held body (12) is inserted into the recess (22) through the side wall opening (28) and locked to the locking projection (32).

4 Claims, 3 Drawing Sheets

(51) Int. Cl.
*B60R 16/02* (2006.01)
*B65D 63/10* (2006.01)
*H02G 3/30* (2006.01)
*F16B 2/08* (2006.01)

(58) Field of Classification Search
USPC ............... 248/63, 74.4; 24/16 PB; 174/72 A
See application file for complete search history.

(56) References Cited

U.S. PATENT DOCUMENTS

| 3,894,707 | A | * | 7/1975 | Heard | ........................ | F16B 2/08 |
|---|---|---|---|---|---|---|
| | | | | | | 248/225.11 |
| 6,294,736 | B1 | * | 9/2001 | Takeda | ..................... | H02G 3/30 |
| | | | | | | 174/72 A |
| 7,390,967 | B2 | * | 6/2008 | Daito | ........................ | H02G 3/32 |
| | | | | | | 174/72 A |
| 2005/0108858 | A1 | | 5/2005 | Daito | | |

FOREIGN PATENT DOCUMENTS

| JP | 11-98654 | 4/1999 |
|---|---|---|
| JP | 2008-232222 | 10/2008 |
| JP | 2013-21828 | 1/2013 |

* cited by examiner

ATTACHMENT STRUCTURE FOR A BINDING BAND

BACKGROUND

1. Field of the Invention

The present invention relates to an attachment structure for binding band for binding and fixing a held body to a holding body by a binding band.

2. Description of the Related Art

Conventionally, in attaching a held body such as a wiring harness to be routed in an automotive vehicle to a holding body such as an electrical connection box or a bracket, an attachment structure for binding and fixing the held body to a supporting wall portion of the holding body by a binding band has been widely adopted. Such an attachment structure for binding band is, for example, known from Japanese Unexamined Patent Publication No. 2008-232222. Specifically, two insertion holes are provided on a supporting wall portion of an electrical connection box as a holding body, a binding band is locked to the supporting wall portion of the holding body and the binding band is tightened together with a wiring harness as a held body by pulling out a tip part of the binding band inserted into one hole from the other hole, whereby the wiring harness is fixedly attached to the electrical connection box by the binding band.

However, an operation of pulling out the tip part of the binding band inserted into one of the two insertion holes provided on the supporting wall portion of the holding body from the other had problems of requiring the tip part of the binding band to be curved in a desired direction, being very cumbersome and taking time.

Contrary to this, in FIG. 5 of Japanese Unexamined Patent Publication No. 2008-232222 and Japanese Unexamined Patent Publication No. 2013-21828, operability is improved by providing a guide wall for guiding a tip part of a binding band toward another insertion hole inside one insertion hole provided on a supporting wall portion of a holding body and reliably guiding the tip part of the binding band toward the other insertion hole.

However, it has caused problems of complicating the structure of the holding body and increasing production cost to provide such a guide wall on a back side of the supporting wall portion of the holding body. Further, to curve the rigid binding band, it is necessary to ensure a relatively long separation distance between the two insertion holes as in Japanese Unexamined Patent Publication No. 2008-232222 and ensure a long length of a curved guiding surface of the guide wall as in Japanese Unexamined Patent Publication No. 2013-21828. Thus, in either case, the enlargement of the attachment structure is unavoidable. If a large space cannot be secured in the holding body, the guide wall cannot be provided and, hence, there has been still room for improvement.

The present invention was developed against the above situation and aims to provide a novel attachment structure for binding band having a simple structure and capable of easily attaching a binding band to a supporting wall portion of a holding body without requiring a large space.

SUMMARY

A first aspect of the present invention is directed to an attachment structure for binding band for binding and fixing a held body to a supporting wall of a holding body by a binding band. The attachment structure includes a recess open on the supporting wall of the holding body and a side wall intersecting with the supporting wall, and a locking projection cantilevered toward a side wall opening of the recess from a bottom surface facing the side wall opening. The binding band is tightened together with the held body in a state where a band main body of the binding band arranged in a ring-like manner around the held body is inserted into the recess through the side wall opening and locked to the locking projection.

According to this aspect, a locking portion of the binding band to the holding body can be formed by a simple structure of providing the recess open on the supporting wall and the side wall of the holding body and providing the locking projection in such a recess. Thus, it is possible to simplify the structure, improve productivity and reduce cost as compared with a structure of providing a guide wall in the supporting wall of the holding body like a conventional structure.

Further, the locking projection to which the binding band is locked is exposed to outside through the opening of the recess. Accordingly, the visibility of the locking projection is ensured and access is facilitated. Thus, the binding band can be locked reliably and quickly to the locking projection and attachment operability can be improved as compared with the case where the binding band is inserted into two insertion holes provided on the supporting wall of the holding body in a state where visual confirmation is not possible as in the conventional structure.

In addition, the locking projection to which the binding band is locked projects in the recess open on the supporting wall and the side wall. Thus, the band main body curved in advance to have an opening width of the recess can be inserted through the side wall opening and locked to the locking projection with the binding band arranged in a ring-like manner around the held body. Thus, it is not necessary to ensure a large space for curving the binding band and it is possible to provide the attachment structure for binding band also in a narrow area. By binding the binding band locked to the locking projection in this way together with the held body, the held body easily is attached fixedly to the holding body with good operability and space efficiency by the binding band.

A retaining protrusion may be provided on a projecting tip part of the locking projection. Accordingly, disengagement of the binding band from the locking projection is prevented by the interference of the binding band with the retaining protrusion even if the binding band is displaced to a tip side of the locking projection due to vehicle vibration or the like. Thus, the separation of the held body from the holding body is prevented.

The side wall may include a first side wall portion and a second side wall portion extending in directions different from each other, and the recess is open on both the first and second side walls. Accordingly, the visibility and accessibility of the locking projection are further improved and an operation of locking the binding band to the locking projection can be performed more quickly and reliably.

According to the present invention, the locking portion of the binding band to the holding body can be formed by the simple structure of providing the recess open on the supporting wall and the side wall of the holding body and providing the locking projection in such a recess. Thus, it is possible to simplify the structure, improve productivity and reduce cost as compared with a structure of providing a guide wall like the conventional structure. Further, since the locking projection to which the binding band is locked is exposed to outside through the opening of the recess, the visibility of the locking projection is ensured and access is facilitated. In addition, the band main body can be inserted through the side wall opening and locked to the locking projection with the binding band arranged in a ring-like manner around the held body. Thus, the attachment structure for binding band can be provided also in a narrow area.

DETAILED DESCRIPTION

Hereinafter, embodiments of the present invention are described with reference to the drawings.

Figure 1:
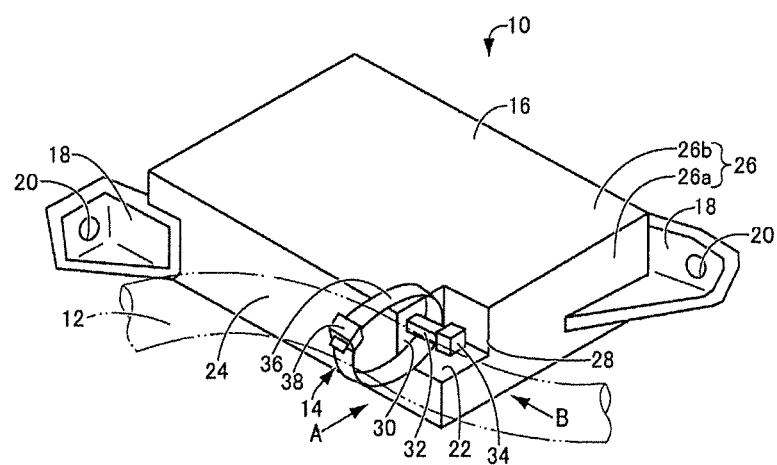
FIG. 1 is a perspective view showing an electrical connection box to which an attachment structure for binding band as one embodiment of the present invention is applied.
Figure 2:
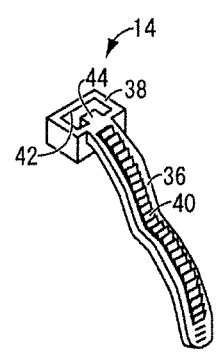
FIG. 2 is an enlarged perspective view before a binding band shown in FIG. 1 is bound.
Figure 3A:
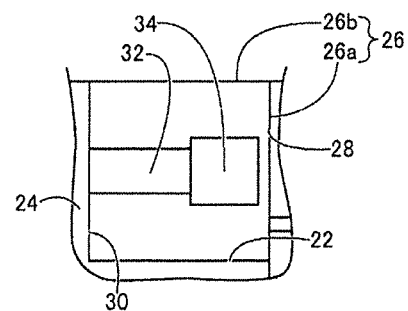
FIG. 3 are enlarged views showing a locking projection shown in FIG. 1 viewed from predetermined positions ((A) view in a direction of an arrow A and (B) view in a direction of an arrow B).
Figure 3B:
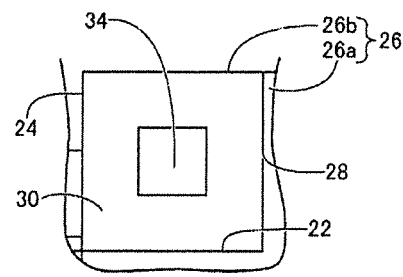

FIGS. 1 to 3 show a structure for binding and fixing a wiring harness 12 as a held body to a later-described supporting wall portion 24 of an electrical connection box 10 as a holding body by a binding band 14 using an attachment structure for binding band as one embodiment of the present invention. As shown in FIG. 1, the electrical connection box 10 is configured so that unillustrated various electrical components, busbars, connectors, etc. are arranged in a case 16 having a substantially block shape. Attachment leg portions 18 are formed to extend outward from two positions on the outer surface of this case 16 and fixed to a vehicle or the like by mounting unillustrated fixing bolts into bolt insertion holes 20 penetrating through the attachment leg portions 18. Here, the case 16 and the attachment leg portions 18 are formed integrally or unitarily of synthetic resin such as polypropylene (PP) or polyamide (PA) by injection molding or the like.

As shown in FIG. 1, one corner of the case 16 of the electrical connection box 10 is cut into a substantially block shape, thereby forming a recess 22. Specifically, the recess 22 is formed to be open on a supporting wall 24 against which the wiring harness 12 is pressed to be supported and a side wall 26 intersecting with the supporting wall 24. Here, the side wall 26 is composed of a first side wall portion 26a and a second side wall portion 26b extending in directions different from each other. In short, the recess 22 is open on both the first and second side wall portions 26a and 26b in addition to the supporting wall 24.

Further, as shown in FIGS. 1 and 3, a substantially column-shaped locking projection 32 cantilevered from a central part of a bottom surface 30 facing a side wall opening of the recess 22, e.g. an opening 28 of the first side wall portion 26a toward the opening 28 is provided in the recess 22. Further, a retaining protrusion 34 is provided on a projecting tip part of the locking projection 32, which is formed into a block shape wider than a base end part. Note that the locking projection 32 is formed so that the projecting tip part is located near the opening 28 of the first side wall portion 26a and does not project outwardly beyond the first side wall portion 26a.

The wiring harness 12 is bound and fixed to the electrical connection box 10 structured as described above using the binding band 14 in accordance with the attachment structure for binding band of this embodiment. More specifically, as shown in FIG. 2, the binding band 14 includes a band main body 36 in the form of a long and narrow flat plate having a rectangular cross-section, and an inserting/locking portion 38 is formed integrally on one end part of this band main body 36 in a length direction. As known, the binding band 14 is molded integrally of a synthetic resin material and the band main body 36 can be curved and deformed. Further, a multitude of sawtooth-like projections 40 are formed side by side in a longitudinal direction of the band main body 36 on one side of the band main body 36 in a thickness direction.

Further, the inserting/locking portion 38 of the binding band 14 is formed with an insertion hole 42 and a locking piece 44 projecting into this insertion hole 42. By curving the band main body 36 into a ring shape and inserting the tip part into the insertion hole 42, the locking piece 44 is locked to the projection 40 of the band main body 36.

Accordingly, the band main body 36 of the binding band 14 is inserted into the recess 22 through the opening 28 of the first side wall portion 26a after being arranged in a ring-like manner around the wiring harness 12. Subsequently, the binding band 14 is tightened with the band main body 36 of the binding band 14 locked to the base end part of the locking projection 32. In this way, the binding band 14 is tightened together with the wiring harness 12 and the wiring harness 12 as a held body is bound and fixed to the supporting wall 24 of the electrical connection box as a holding body by the binding band 14.

According to such an attachment structure for binding band according to this embodiment, the locking projection 32 as a locking portion of the binding band 14 to the electrical connection box 10 can be formed by a simple structure of providing the recess 22 open on the supporting wall 24 and the side wall 26 of the electrical connection box 10 and providing the locking projection 32 in the recess 22. Thus, as compared with a structure of providing a guide wall like a conventional structure, it is possible to simplify the structure, improve productivity and reduce cost.

In addition, since the locking projection 32 to which the binding band 14 is locked is exposed to outside through the opening of the recess 22, the visibility of the locking projection 32 is ensured and access is facilitated. Thus, the binding band 14 can be locked reliably and quickly locked to the locking projection 32 and attachment operability can be improved as compared with the case where the binding band is inserted into two insertion holes provided on the supporting wall portion of the holding body in a state where visual confirmation is not possible as in the conventional structure.

Further, since the retaining protrusion 34 is provided on the projecting tip part of the locking projection 32, the disengagement of the binding band 14 from the locking projection 32 is prevented by the interference of the binding band 14 with the retaining protrusion 34 even if the binding band 14 is displaced to the tip side of the locking projection 32 due to vehicle vibration or the like. Thus, the separation of the wiring harness 12 from the electrical connection box 10 is prevented.

In addition, since the locking projection 32 to which the binding band 14 is locked projects in the recess 22 open on the supporting wall 24 and the side wall 26, the band main body 36 curved in advance to have an opening width of the recess 22 can be inserted through the opening 28 of the first side wall portion 26a and locked to the locking projection 32 with the binding band 14 arranged in a ring-like manner around the wiring harness 12. Thus, it is not necessary to ensure a large space for curving the binding band 14 and it is possible to provide the attachment structure for binding band also in a narrow area. By binding the binding band 14 locked to the locking projection 32 in this way together with the wiring harness 12, the wiring harness 12 easily is attached fixedly to the electrical connection box 10 with good operability and space efficiency by the binding band 14.

Further, since the recess 22 is opened on both the first and second side wall portions 26a, 26b extending in two different directions, the visibility and accessibility of the locking projection 32 are further improved and an operation of locking the binding band 14 to the locking projection 32 can be performed more quickly and reliably.

Figure 4A:
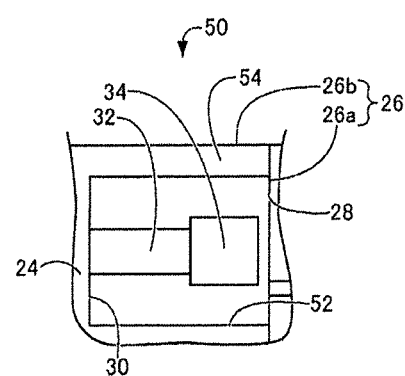
FIG. 4 are views, corresponding to FIGS. 3, showing an electrical connection box as another embodiment of the present invention viewed from predetermined positions ((A) view in the direction of the arrow A and (B) view in the direction of the arrow B).
Figure 4B:
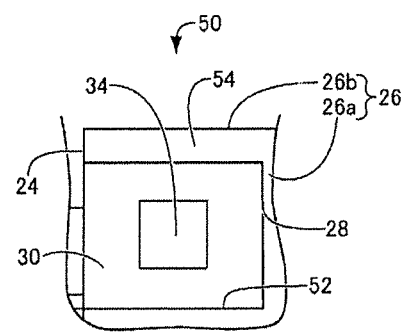

An electrical connection box 50 as another embodiment of the present invention is described in detail using FIGS. 4. Members and parts structured similarly to the above embodiment are not described in detail by being denoted by the same reference signs as in the above embodiment in FIGS. 4. Specifically, such an electrical connection box 50 of this embodiment differs from the above embodiment in that (i) an opening on a second side wall portion 26b is closed by an extending wall portion 54 extending from the second side wall portion 26b in a recess 52.

Also in the electrical connection box 50 as this embodiment, the attachment structure for binding band of the present invention can be advantageously applied as in the electrical connection box 10 of the above embodiment. More specifically, as shown in FIGS. 1 and 4, a band main body 36 of a binding band 14 is inserted into the recess 52 through an opening 28 of a first side wall portion 26a after being first arranged in a ring-like manner around a wiring harness 12. Subsequently, the binding band 14 is tightened with the band main body 36 of the binding band 14 locked to a base end part of a locking projection 32. In this way, the binding band 14 is tightened together with the wiring harness 12 and the wiring harness 12 as a held body is bound and fixed to a supporting wall portion 24 of the electrical connection box 50 as a holding body by the binding band 14.

Here, in this embodiment, the recess 52 is open only on a supporting wall 25 of the electrical connection box 50 and the first side wall portion 26a as one side wall portion intersecting with the supporting wall 24. Since this causes the recess 52 to be covered by the extending wall portion 54 of the second side wall portion 26b as another side wall portion, the interference of the band main body 36 and the like locked to the locking projection 32 with other members can be advantageously prevented.

Although the embodiments of the present invention have been described in detail above, the present invention is not limited to the specific description of the embodiments. For example, the attachment structure for binding band of the present invention is similarly applicable in any case provided that the attachment structure is for binding and fixing the held body to the holding body to which the binding band 14 is attached such as a wire holding bracket, a protector or a clip beside the electrical connection boxes 10, 50.

LIST OF REFERENCE SIGNS 10, 50: electrical connection box (holding body)
12: wiring harness (held body)
14: binding band
22, 52: recess
24: supporting wall
26: side wall
26a: first side wall portion
26b: second side wall portion
28: opening (opening on side wall)
30: bottom surface
32: locking projection
34: retaining protrusion
36: band main body

The invention claimed is:

1. An attachment structure for a binding band for binding and fixing a held body to a supporting wall of a holding body by the binding band, comprising:
   a recess open on the supporting wall of the holding body and a side wall intersecting with the supporting wall; and
   a locking projection cantilevered toward a side wall opening of the recess from a bottom surface facing the side wall opening,
   wherein the binding band is tightened together with the held body in a state where a band main body of the binding band arranged in a ring-like manner around the held body is inserted into the recess through the side wall opening and locked to the locking projection.

2. The attachment structure for a binding band of claim 1, wherein a retaining protrusion is provided on a projecting tip part of the locking projection.

3. The attachment structure for a binding band of claim 2, wherein the side wall includes a first side wall portion and a second side wall portion extending in directions different from each other, and the recess is open on both the first and second side wall portions.

4. The attachment structure for a binding band of claim 1, wherein the side wall includes a first side wall portion and a second side wall portion extending in directions different from each other, and the recess is open on both the first and second side wall portions.

* * * * *